United States Patent
Huang et al.

(10) Patent No.: US 8,119,961 B2
(45) Date of Patent: Feb. 21, 2012

(54) SOLAR TRACKING DEVICE FOR SOLAR PANEL

(75) Inventors: Cheng-Yu Huang, Taoyuan County (TW); Te-Kai Ku, Hsinchu County (TW); Hsin-Kai Wang, Taipei County (TW); Chi-Yin Lin, Taichung County (TW)

(73) Assignee: Pacific Speed Limited, Wanchai (HK)

( * ) Notice: Subject to any disclaimer, the term of this patent is extended or adjusted under 35 U.S.C. 154(b) by 793 days.

(21) Appl. No.: 12/254,747

(22) Filed: Oct. 20, 2008

(65) Prior Publication Data
US 2010/0095954 A1   Apr. 22, 2010

(51) Int. Cl.
*F24J 2/38* (2006.01)
*H01J 3/14* (2006.01)

(52) U.S. Cl. .......... 250/203.4; 250/216; 250/206.1; 126/573; 126/600

(58) Field of Classification Search .......... 250/216, 250/239, 203.1, 203.4, 206.1, 206.2; 126/572, 126/573, 600, 692; 136/246
See application file for complete search history.

(56) References Cited

U.S. PATENT DOCUMENTS
2011/0041834 A1* 2/2011 Liao .............................. 126/605
2011/0253883 A1* 10/2011 Lin et al. ....................... 250/216
* cited by examiner

*Primary Examiner* — Kevin Pyo
(74) *Attorney, Agent, or Firm* — WPAT, P.C.; Anthony King

(57) ABSTRACT

A solar tracking device for solar panel includes a barrel body, a light transmitting unit, a projecting unit, a photosensor unit, and a lens. The light transmitting unit is disposed at a first end of the barrel body oriented toward the sun. The light transmitting unit has a light-transmittable crossing point provided at a center thereof. The projecting unit is an opaque member arranged between the first end and a second end of the barrel body. The photosensor unit is arranged to one side of the projecting unit, so that the projecting unit is located between the light transmitting unit and the photosensor unit. The photosensor unit has a locating center preset at a center of the projecting unit. The lens is arranged between the projecting unit and the photosensor unit. The barrel body is a telescopic barrel enabling the solar tracking device to switch between different operating angle modes.

8 Claims, 5 Drawing Sheets

SOLAR TRACKING DEVICE FOR SOLAR PANEL

FIELD OF THE INVENTION

The present invention relates to a solar tracking device for solar panel, and more particularly to a highly sensitive and highly accurate solar tracking device with great field of view for solar panel.

BACKGROUND OF THE INVENTION

It is known continuous consumption of petrochemical fuel will eventually result in depletion of the earth's natural oil resources. Therefore, people have positively tried to exploit other substitution energy resources, such as solar energy, wind energy, hydraulic energy, etc. Among others, solar energy power generation has been most widely exploited and employed. In a conventional solar power generation system, one or more solar panels are oriented toward the sun, so that sunlight is absorbed by solar cells and converted into electrical energy. For the solar panel to always orient toward the sun, a solar tracking device is mounted on the solar panel for tracking sunlight. In a conventional solar tracking system, photoresistance is employed for tracking sunlight. However, the photoresistance has a relatively high sensing error and fails to accurately orient the solar panel toward the sun.

It is therefore tried by the inventor to develop a highly sensitive solar tracking device that can accurately orient a solar panel toward sunlight with wide detecting range.

SUMMARY OF THE INVENTION

A primary object of the present invention is to provide a solar tracking device for solar panel, so that a solar panel with the solar tracking device mounted thereto can always be sensitively, accurately and widely oriented toward sunlight.

To achieve the above and other objects, the solar tracking device for solar panel according to the present invention includes a barrel body; a light transmitting unit disposed at a first end of the barrel body facing toward the sun and having a centered light-transmittable crossing point; a projecting unit arranged between the first end and an opposite second end of the barrel body and being an opaque member; a photosensor unit arranged to one side of the projecting unit, so that the projecting unit is located between the light transmitting unit and the photosensor unit, and having a locating center preset at a center of the projecting unit; and a lens arranged between the projecting unit and the photosensor unit.

An image of the crossing point of the light transmitting unit is projected onto the projecting unit, and the projected image of the crossing point on the light transmitting unit is formed on the photosensor unit via the lens. With these arrangements, the solar tracking device can have enhanced sensitivity and accuracy. Moreover, the barrel body of the solar tracking device can be a telescopic barrel for switching the solar tracking device between a narrow-angle mode and a wide-angle mode.

In the present invention, the telescopic barrel body is in the form of a cylinder; the light transmitting unit includes a light-transmittable cross-shaped target pattern; the projecting unit is a piece of frosted glass; and the photosensor unit is a complementary metal oxide semiconductor (CMOS) or a charge coupled device (CCD).

The solar tracking device for solar panel according to the present invention further includes a photosensor unit seat for holding the photosensor unit thereto. The photosensor unit seat is connected at an end to the second end of the barrel body. The solar tracking device also includes a seat cover screwed to the photosensor unit seat for covering another end thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
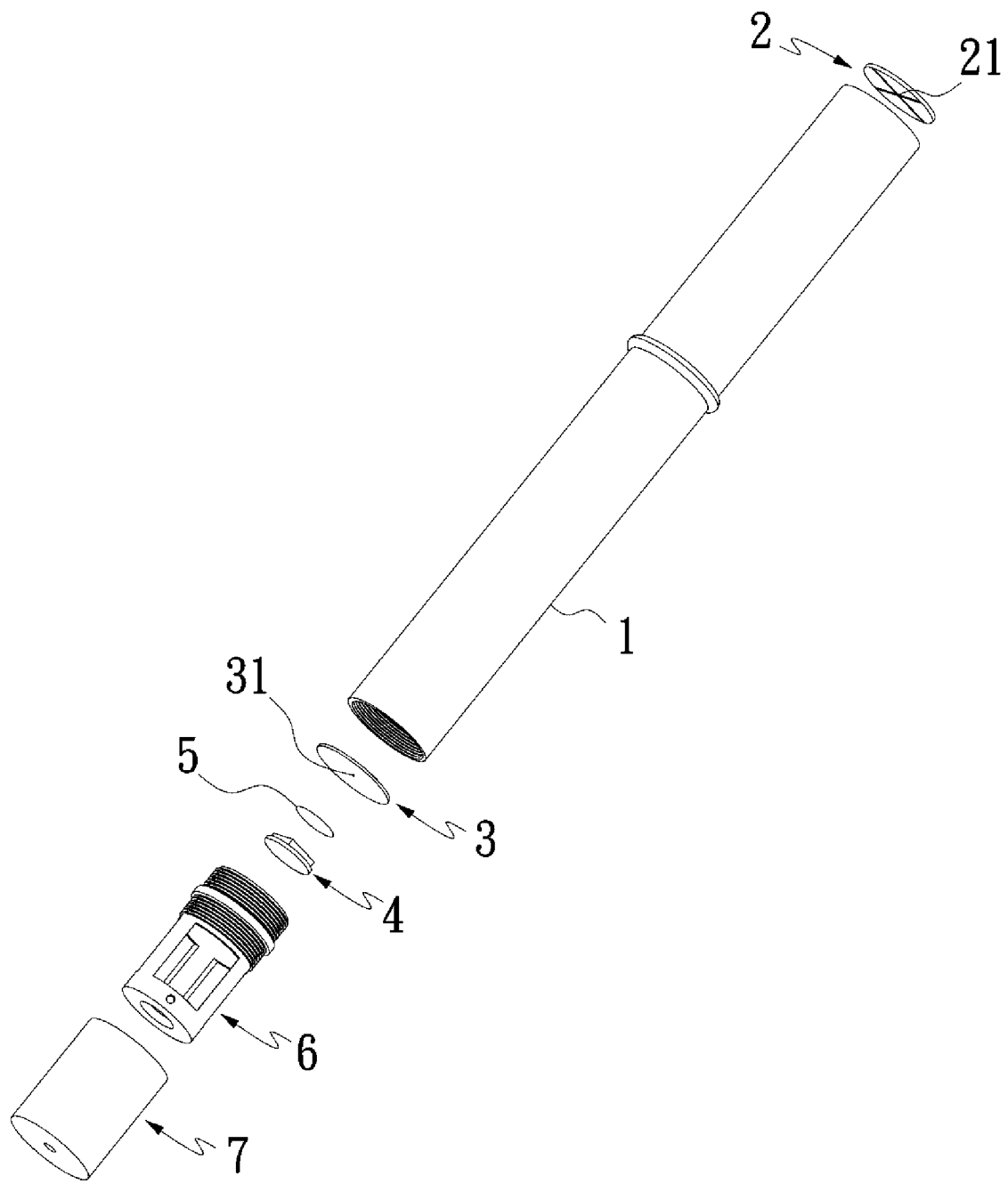
FIG. 1 is an exploded perspective view of a solar tracking device for solar panel according to a preferred embodiment of the present invention.
Figure 2:
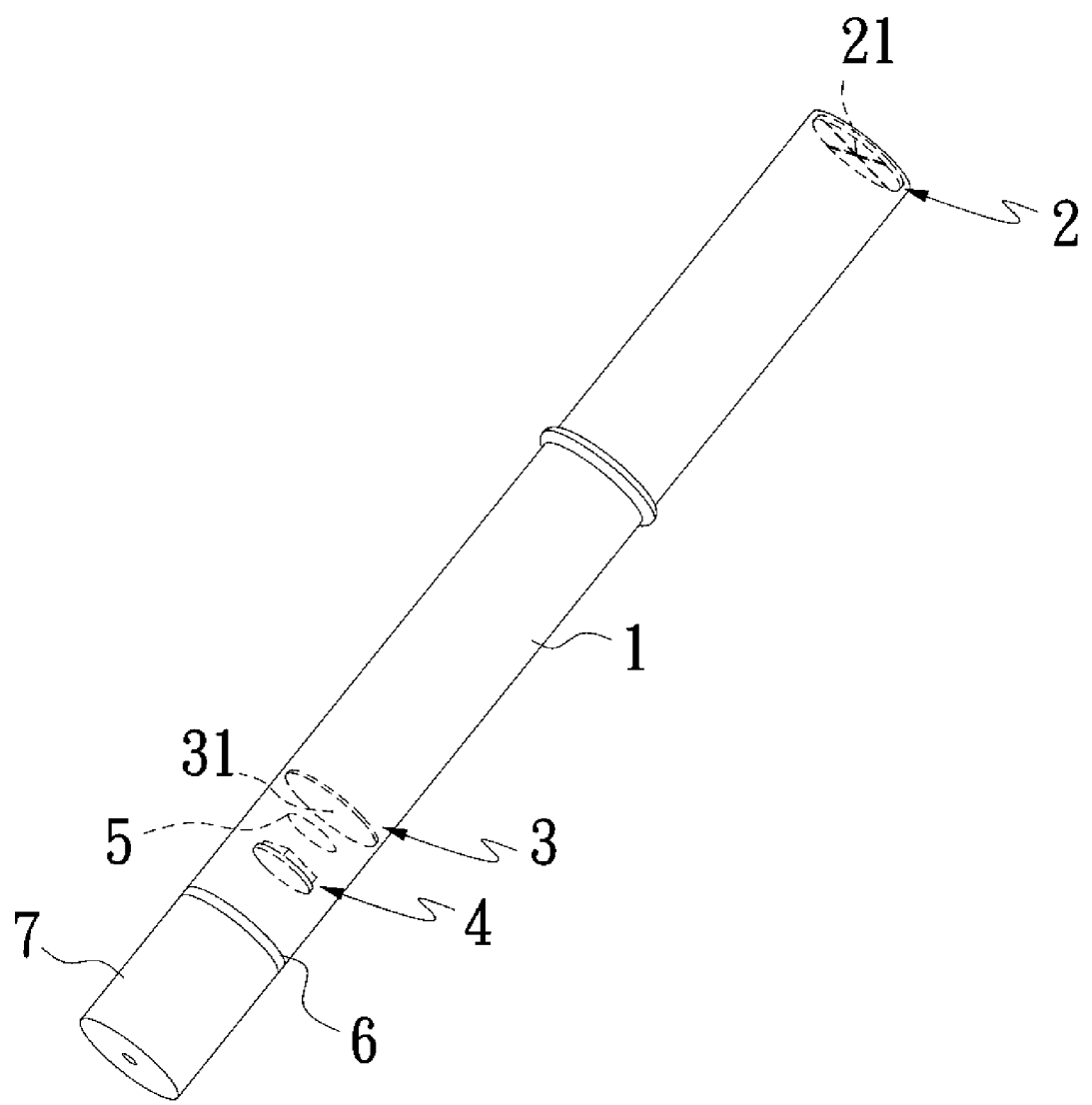
FIG. 2 is an assembled view of FIG. 1.

Please refer to FIGS. 1 and 2 that are exploded and assembled perspective views, respectively, of a solar tracking device for solar panel according to a preferred embodiment of the present invention. As shown, the solar track device includes a barrel body 1, a light transmitting unit 2, a projecting unit 3, a photosensor unit 4, and a lens 5.

The barrel body 1 can be a telescopic barrel and in the form of a cylinder.

The light transmitting unit 2 is disposed at a first end of the barrel body 1 facing toward the sun. The light transmitting unit 2 includes a crossing point 21 located at a center thereof. For example, the light transmitting unit 2 can be a light-transmittable cross-shaped target pattern or other object having a light-transmittable crossing point.

The projecting unit 3 is arranged in the barrel body 1 between the first end and an opposite second end thereof. The projecting unit 3 is an opaque member, such as a piece of frosted glass.

The photosensor unit 4 is arranged to one side of the projecting unit 3, so that the projecting unit 3 is located between the light transmitting unit 2 and the photosensor unit 4. The photosensor unit 4 has a locating center 31 preset at a center of the projecting unit 3. And, the photosensor unit 4 can be a complementary metal oxide semiconductor (CMOS) or a charge coupled device (CCD).

The lens 5 is arranged between the projecting unit 3 and the photosensor unit 4, so that an image of the projecting unit 3 can be formed on the photosensor unit 4 via the lens 5.

The solar tracking device for solar panel according to the present invention further includes a photosensor unit seat 6 and a seat cover 7. The photosensor unit seat 6 has an end screwed to the second end of the barrel body 1 for holding the photosensor unit 4 thereto. The seat cover 7 is screwed to another end of the photosensor unit seat 6 opposite to the barrel body 1.

Figure 3:
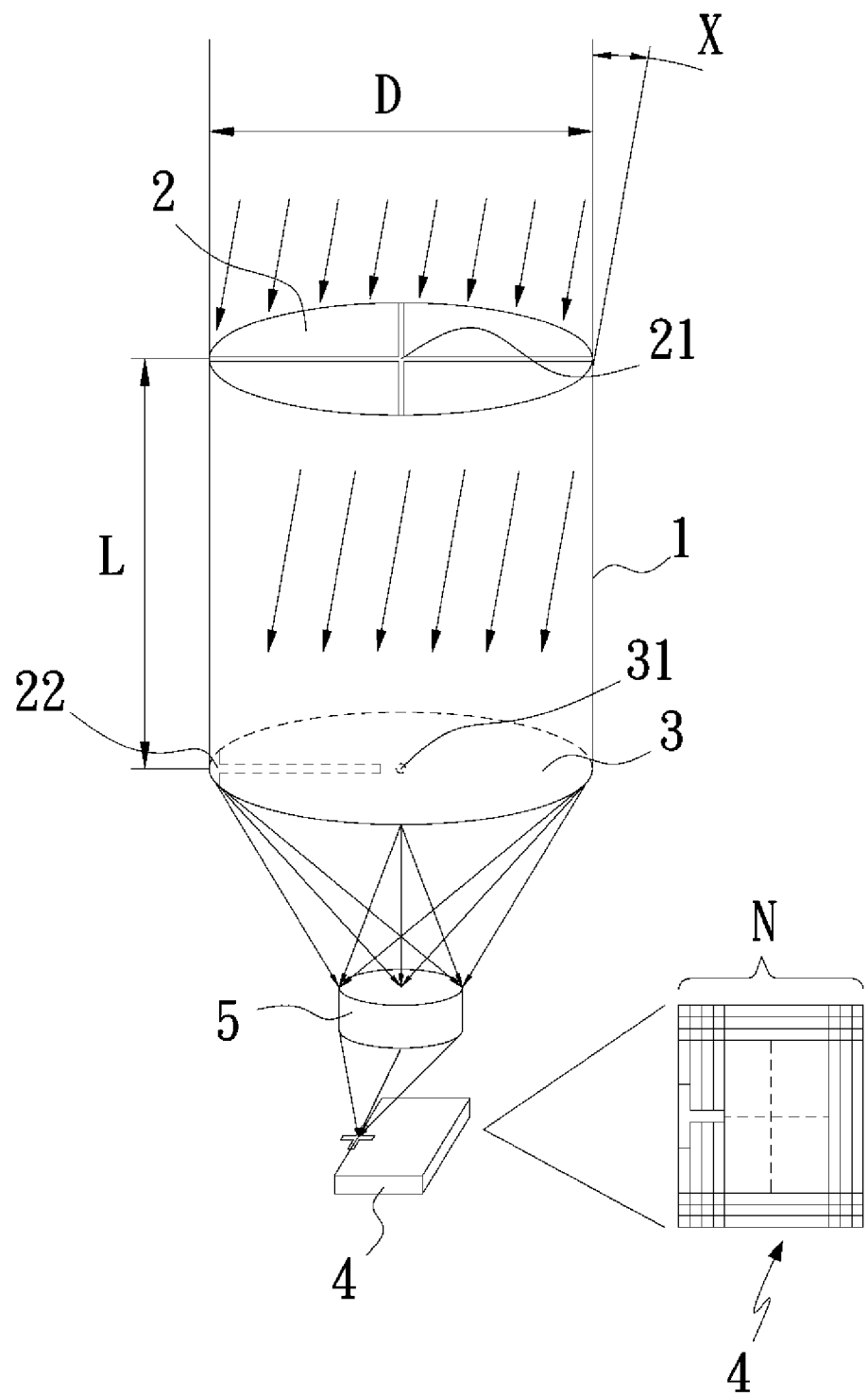
FIG. 3 is a conceptual view showing how an image of a cross-shaped target pattern is formed on a photosensor unit of the present invention.

Please now refer to FIG. 3, which shows how the image of the projecting unit 2 is formed on the photosensor unit 4 of the solar tracking device of the present invention. As shown, when the solar tracking device for solar panel is in use, sunlight is incident upon the barrel body 1 and passes through the light transmitting unit 2 disposed at the first end of the barrel body 1. At this point, a crossing point image 22 of the crossing point 21 of the light transmitting unit 2 is projected onto the projecting unit 3. As aforesaid, the projecting unit 3 is an opaque member. Therefore, the photosensor unit 4 located to one side of the projecting unit 3 will sense the crossing point image 22 of the crossing point 21 via the lens 5. The photosensor unit 4 will then compare the crossing point image 22 with the locating center 31 and find the deviation of the crossing point image 22 from the locating center 31. Then, the photosensor unit 4 will adjust an angle of the barrel body 1 based on the deviation of the crossing point image 22 from the locating center 31 until the crossing point image 22 is aligned with the locating center 31. With the crossing point image 22 aligned with the locating center 31, it means the barrel body 1 and the solar panel with the solar tracking device mounted thereto are directly oriented toward the sun. A maximum angle of incidence X of sunlight on the barrel body 1 can be obtained from the following equation:

$$x = \sin^{-1}\frac{D/2}{\sqrt{(D/2)^2 + L^2}}$$

where, D is an outer diameter of the light transmitting unit 2; and L is an overall length of the barrel body 1.

Given that the photosensor unit 4 has N pixels in one direction, and the maximum angle of incidence of sunlight upon the light transmitting unit 2 is X, the solar tracking device will have an identification sensitivity near X/N degree. That is, each one of the pixels represents an identification sensitivity of X/N degree. In the case a photosensor unit 4 having a high pixel density is used, a very-high-definition image can be obtained. Under this circumstance, the photosensor unit 4 can easily sense even a very minor change in the angle of incidence of sunlight on the light transmitting unit 2.

Figure 4:
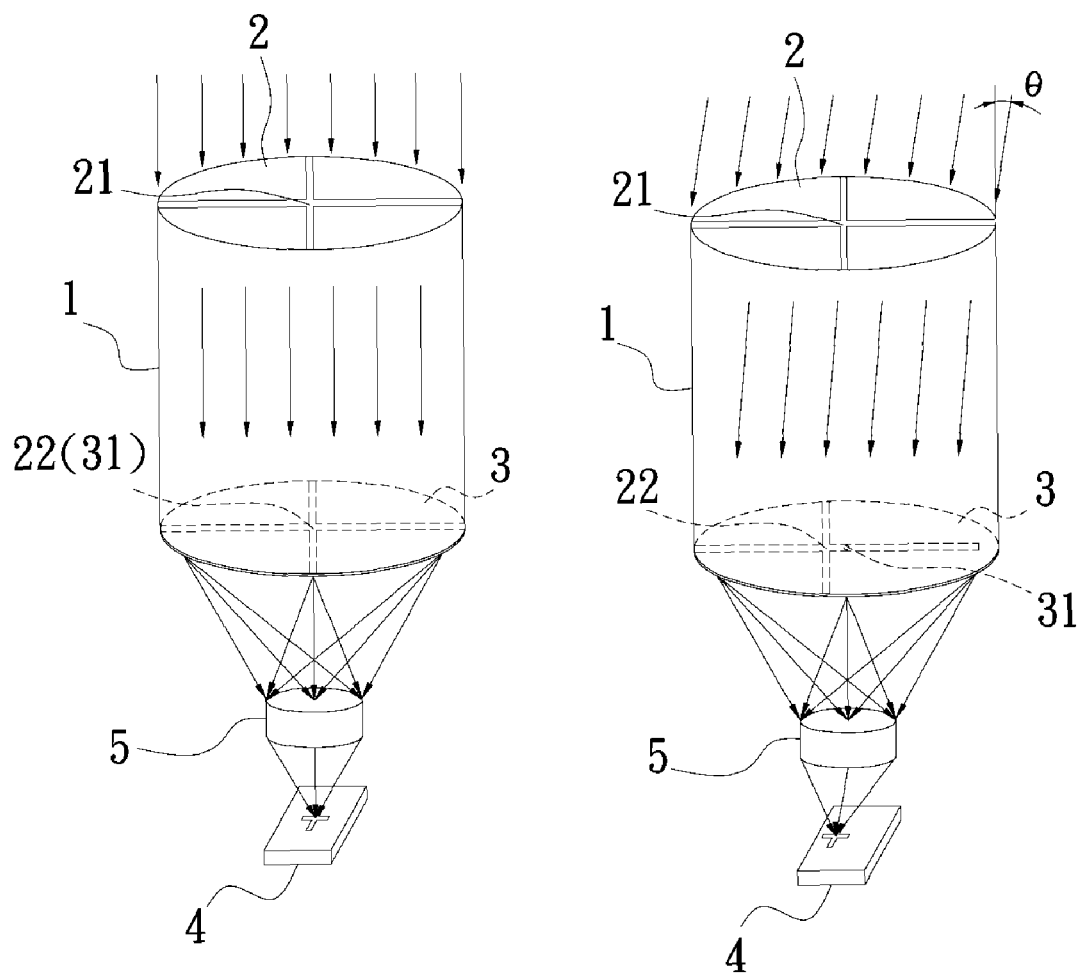
FIG. 4 is a conceptual view showing a first example of operation of the present invention to track sunlight.

Please now refer to FIG. 4, which shows a first example of operation of the solar tracking device of the present invention to track sunlight. As shown in the left part of FIG. 4, when the barrel body 1 and the solar panel having the solar tracking device mounted thereto (not shown) are directly oriented toward the sun, sunlight is incident upon the barrel body 1 and passes through the light transmitting unit 2 disposed at the first end of the barrel body 1. At this point, the crossing point image 22 of the crossing point 21 of the light transmitting unit 2 is projected onto the projecting unit 3. As aforesaid, the projecting unit 3 is an opaque member, and accordingly, the photosensor unit 4 arranged to one side of the projecting unit 3 will sense the crossing point image 22 of the crossing point 21 via the lens 5. Since the barrel body 1 is directly oriented to the sun, the photosensor unit 4 will sense that the crossing point image 22 is in alignment with the locating center 31. However, as can be seen from the right part of FIG. 4, when the sun angularly deviates by an angle θ, the sunlight is obliquely incident upon the barrel body 1 and passes through the light transmitting unit 2 at the angle θ, and the crossing point image 22 of the crossing point 21 of the light transmitting unit 2 is projected onto the projecting unit 3. As aforesaid, the projecting unit 3 is an opaque member, allowing the photosensor unit 4 arranged to one side of the projecting unit 3 to sense the crossing point image 22 of the crossing point 21 via the lens 5. The photosensor unit 4 then compares the crossing point image 22 with the locating center 31 and finds the deviation of the crossing point image 22 from the locating center 31. Then, the barrel body 1 is adjusted to a different angular position based on the deviation of the crossing point image 22 from the locating center 31 until the crossing point image 22 is in alignment with the locating center 31. In this manner, the barrel body 1 and the solar panel can be directly oriented toward the sun again.

Figure 5:
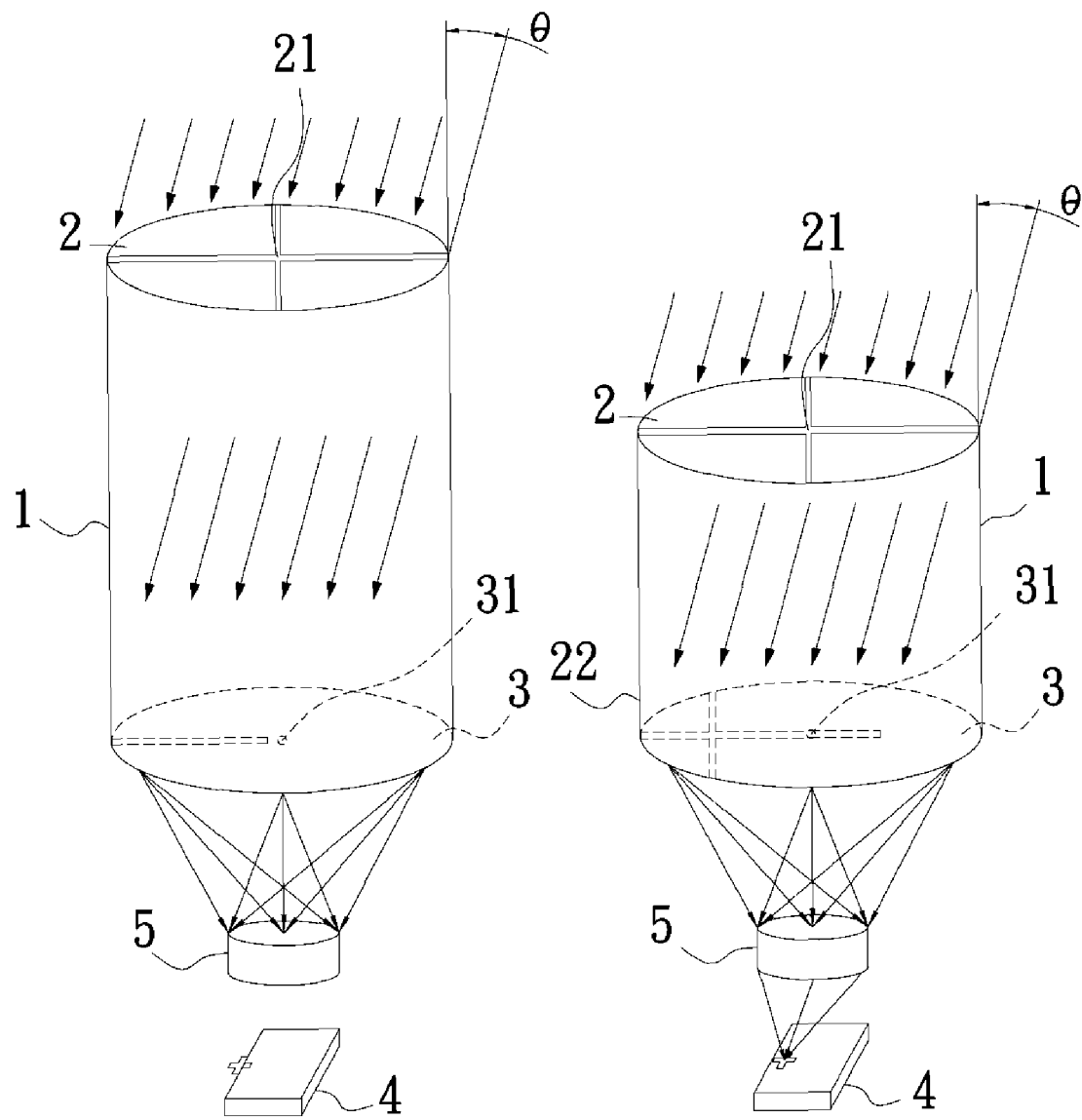
FIG. 5 is conceptual view showing a second example of operation of the present invention to track sunlight.

Please now refer to FIG. 5, which shows a second example of the operation of the solar tracking device of the present invention. When the sun has angularly displaced by such an angle θ that the crossing point image (not shown) of the crossing point 21 of the light transmitting unit 2 is located beyond the sensing range of the photosensor unit 4, as shown in the left part of FIG. 5, the barrel body 1 can be telescoped as shown in the right part of FIG. 5, so that the angle of incidence of sunlight θ is smaller or equal to the maximum angle of incidence of sunlight, as indicated by the following equation, and the crossing point image 22 of the crossing point 21 can be formed on the photosensor unit 4 via the lens 5 again:

$$\theta = \sin^{-1}\frac{D/2}{\sqrt{(D/2)^2 + L^2}}$$

Thereafter, in the same manner as described with reference to FIG. 4, the barrel body 1 can be adjusted to a different angular position until the crossing point image 22 is in alignment with the locating center 31, that is, the barrel body 1 and the solar panel are directly oriented toward the sun again.

With the above arrangements, the solar tracking device for solar panel according to the present invention is novel, improved, and industrial valuable for use. More specifically, with the arrangements of the present invention, the image of the crossing point on the light transmitting unit can be projected onto the projecting unit, and the projected image of the crossing point on the light transmitting unit can be formed on the photosensor unit via the lens, enabling the solar tracking device to have enhanced sensitivity and accuracy in tracking sunlight. Moreover, the barrel body of the solar tracking device of the present invention can be telescoped for the solar tracking device to switch between a narrow-angle mode and a wide-angle mode. Therefore, it is anticipated products derived from the present invention would fulfill the current market demands.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A solar tracking device for solar panel, comprising:
    a barrel body;
    a light transmitting unit being disposed at a first end of the barrel body oriented toward the sun, and having a light-transmittable crossing point provided at a center thereof;
    a projecting unit being arranged in the barrel body between the first end and an opposite second end thereof, and the projecting unit being an opaque member;
    a photosensor unit being arranged to one side of the projecting unit, so that the projecting unit is located between the light transmitting unit and the photosensor unit, and the photosensor unit having a locating center being preset at a center of the projecting unit; and
    a lens being arranged between the projecting unit and the photosensor unit.

2. The solar tracking device for solar panel as claimed in claim 1, wherein the barrel body is a telescopic barrel.

3. The solar tracking device for solar panel as claimed in claim 1, wherein the barrel body is in the form of a cylinder.

4. The solar tracking device for solar panel as claimed in claim 1, wherein the light transmitting unit includes a light-transmittable cross-shaped target pattern.

5. The solar tracking device for solar panel as claimed in claim 1, wherein the projecting unit is a piece of frosted glass.

6. The solar tracking device for solar panel as claimed in claim 1, wherein the photosensor unit is selected from the group consisting of a complementary metal oxide semiconductor (CMOS) and a charge coupled device (CCD).

7. The solar tracking device for solar panel as claimed in claim 1, further comprising a photosensor unit seat, the photosensor unit seat being connected at an end to the second end of the barrel body, and the photosensor unit being held to the photosensor unit seat.

8. The solar tracking device for solar panel as claimed in claim 7, further comprising a seat cover; and the seat cover being connected to another end of the photosensor unit seat opposite to the barrel body to cover the photosensor unit seat.

* * * * *